(12) United States Patent
Large (10) Patent No.: US 10,585,230 B2
(45) Date of Patent: Mar. 10, 2020

(54) LIGHT-STEERING LAYER FOR ELECTRONIC DISPLAY

(71) Applicant: Microsoft Technology Licensing, LLC, Redmond, WA (US)

(72) Inventor: Timothy A. Large, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 144 days.

(21) Appl. No.: 15/078,664

(22) Filed: Mar. 23, 2016

(65) Prior Publication Data

US 2017/0276864 A1    Sep. 28, 2017

(51) Int. Cl.
| | |
|---|---|
| *F21V 8/00* | (2006.01) |
| *G02B 5/02* | (2006.01) |
| *G02B 5/09* | (2006.01) |
| *G02F 1/1335* | (2006.01) |

(52) U.S. Cl.
CPC .......... *G02B 6/0061* (2013.01); *G02B 5/0231* (2013.01); *G02B 5/09* (2013.01); *G02B 6/0036* (2013.01); *G02B 6/0053* (2013.01); *G02F 1/133553* (2013.01)

(58) Field of Classification Search
CPC .... G02B 5/003; G02B 27/0018; G02B 5/045; G02B 5/0278; G02B 2207/123; G02B 1/118; G02B 5/0221; G02B 5/0231; G02B 5/0236; G02B 5/0268; G02B 17/006; G02B 1/11; G02B 1/111; G02B 26/08; G02B 27/0101; G02B 5/02; G02B 5/0242

USPC .......... 359/613, 601, 614, 599, 608, 488.01, 359/298, 350, 355, 359
See application file for complete search history.

(56) References Cited

U.S. PATENT DOCUMENTS

| | | | |
|---|---|---|---|
| 6,206,525 | B1 | 3/2001 | Rowland et al. |
| 7,530,726 | B2 | 5/2009 | Brewer et al. |
| 7,646,448 | B2 | 1/2010 | Robinson et al. |

(Continued)

FOREIGN PATENT DOCUMENTS

| | | |
|---|---|---|
| CN | 102635809 A | 8/2012 |
| TW | 201248260 A | 12/2012 |
| WO | 2015102961 A1 | 7/2015 |

OTHER PUBLICATIONS

ISA European Patent Office, International Search Report and Written Opinion Issued in PCT Application No. PCT/US2017/022854, dated May 26, 2017, WIPO, 10 Pages.

(Continued)

*Primary Examiner* — William R Alexander
*Assistant Examiner* — Sharrief I Broome
(74) *Attorney, Agent, or Firm* — Alleman Hall Creasman & Tuttle LLP (57) ABSTRACT

Examples are disclosed that relate to backlit electronic displays that may help to avoid apparent non-uniform image brightness across a displayed image. One example provides an electronic display comprising a light guide, an image-forming layer, and a light-steering layer. The light guide is configured to release light over a display area. The image-forming layer is configured to form a display image by modulating the light released by the light guide. The light-steering layer is configured to steer together the light released from a peripheral region of the light guide and the light released from a central region of the light guide.

16 Claims, 8 Drawing Sheets

(56) References Cited

U.S. PATENT DOCUMENTS

| | | | |
|---|---|---|---|
| 8,300,304 B2 | 10/2012 | Gally et al. | |
| 8,599,483 B1 | 12/2013 | Weber et al. | |
| 8,674,616 B2 | 3/2014 | Holman et al. | |
| 8,727,593 B2 | 5/2014 | Doyle et al. | |
| 2006/0291243 A1 | 12/2006 | Niioka et al. | |
| 2007/0217227 A1* | 9/2007 | Watanabe | G02B 6/0038 362/615 |
| 2008/0089090 A1 | 4/2008 | Bathiche et al. | |
| 2011/0243500 A1* | 10/2011 | Lee | G02B 6/0036 385/31 |
| 2012/0140518 A1* | 6/2012 | Solomon | G02B 6/0016 362/607 |
| 2014/0049983 A1* | 2/2014 | Nichol | G02B 6/0018 362/610 |
| 2014/0085570 A1* | 3/2014 | Kuwata | G02B 6/0053 349/65 |
| 2014/0218284 A1 | 8/2014 | Mienko et al. | |
| 2014/0240828 A1* | 8/2014 | Robinson | G02B 27/26 359/465 |

OTHER PUBLICATIONS

Kim, et al., "Eliminating Hotspots in a Multi-Chip LED Array Direct Backlight System with Optimal Patterned Reflectors for Uniform Illuminance and Minimal System Thickness", In Journal of Optics Express, vol. 18, Issue 8, Apr. 8, 2010, pp. 8595-8604.

Pan, et al., "High Luminance Hybrid Light Guide Plate for Backlight Module Application", In Journal of Optics Express, vol. 19, Issue 21, Sep. 29, 2011, pp. 20079-20087.

Teng, et al., "Highly Precise Optical Model for Simulating Light Guide Plate Using LED Light source", In Journal of Optics Express, vol. 18, Issue 21, Oct. 5, 2010, pp. 22208-22214.

Sun, et al., "Brightness management in a direct LED backlight for LCD TVs", Journal of the Society for Information Display, vol. 16, Issue 4, Apr. 2008, pp. 519-526.

U.S. Appl. No. 14/552,762, Large, Timothy, "Laminated Backlight Unit", filed Nov. 25, 2014.

"First Office Action and Search Report Issued in Chinese Patent Application No. 201780019918.2", dated Sep. 30, 2019, 12 Pages.

\* cited by examiner

LIGHT-STEERING LAYER FOR ELECTRONIC DISPLAY

BACKGROUND

An image displayed by an electronic display may appear uniformly bright when viewed from a range of angles, provided that light emission from the display is broadly diffused. Broad-angle diffusion, however, may reduce the energy efficiency of the display, by directing light toward vantage points where no observer may be present. To address this issue, some electronic displays are configured to output display light viewable over a narrow range of angles. This approach, however, may result in the display image being brighter in the middle of the screen than at the periphery. The explanation is that the periphery of a large display screen from the point of view of an observer situated opposite a central portion of the screen, is sighted at relatively high angles relative to the surface normal, where the output intensity is reduced.

SUMMARY

Examples are disclosed that relate to backlit electronic displays that may help to avoid apparent non-uniform image brightness across a displayed image. One example provides an electronic display comprising a light guide, an image-forming layer, and a light-steering layer. The light guide is configured to release light over a display area. The image-forming layer is configured to form a display image by modulating the light released by the light guide. The light-steering layer is configured to steer together the light released from a peripheral region of the light guide and the light released from a central region of the light guide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

DETAILED DESCRIPTION

As noted above, some backlit displays may appear to have non-uniform brightness when positioned relatively close to an observer. This may be particularly noticeable for larger displays and/or displays that emit light over narrow ranges of viewing angles. Thus, examples are disclosed herein that relate to the use of a light-steering layer that directs light output by the display system in a manner that may help to avoid such apparent non-uniformities in brightness across an area of a displayed image. The light-steering layer has rows of faceted structures coated with reflective material. The faceted structures reflect the light released from the light guide, such that the angle of the reflected light depends on the facet angle. The faceted structures disclosed herein may be circular in shape, or have any other suitable curvature. Further, the angle of the facets may be adjusted so that the angle of reflection increases with increased radius. Consequently, light emission from peripheral and central areas of the backlight are both redirected toward the observer's eyes, resulting in a uniform image intensity for users appropriately situated. In other examples, such faceted structures may be refractive instead of reflective, and be positioned between the light-guide portion of the display backlight and a spatial light modulator.

Aspects of this and other implementations will now be described by example, and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and not necessarily drawn to scale. Except where specifically noted, the various drawing scales, aspect ratios, and numbers of components shown in the figures may be purposely distorted to make certain features or relationships easier to see.

Figure 1:
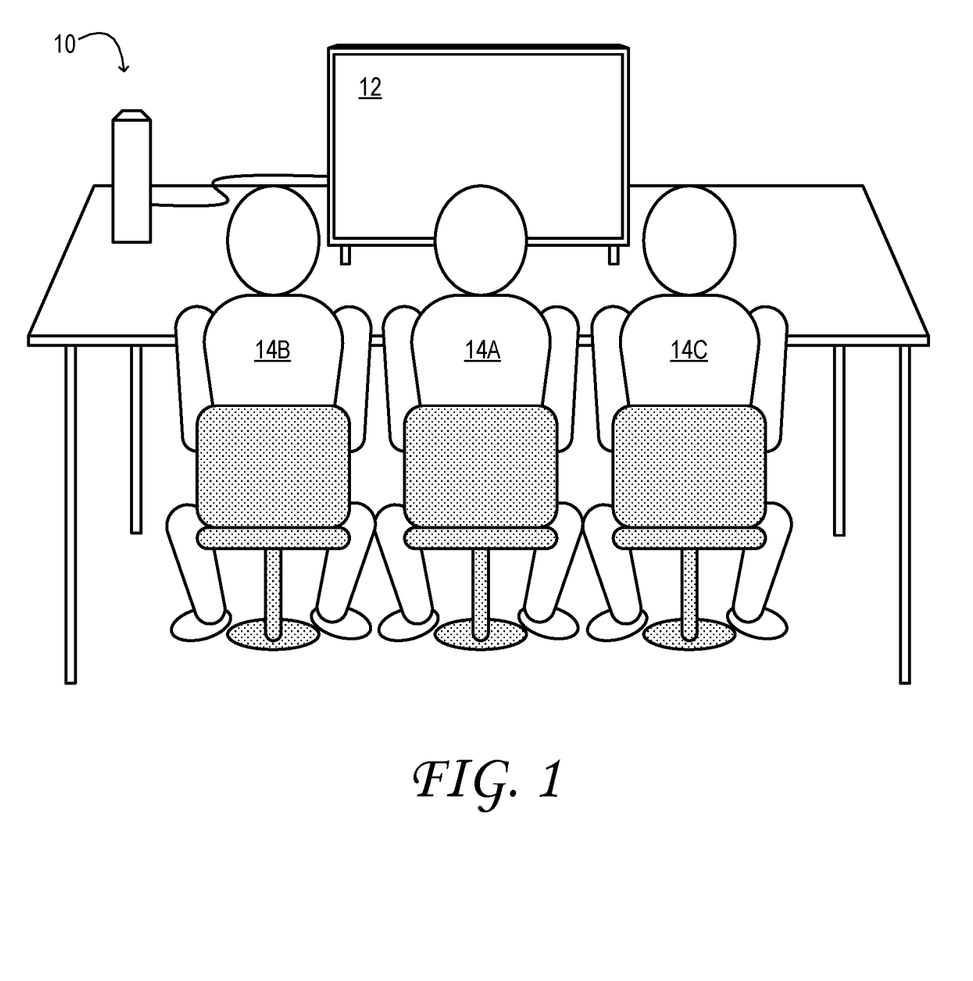
FIG. 1 shows aspects of an example device having an electronic display, and an example use scenario for the device.

FIG. 1 shows an example device 10 having an electronic display 12. The device of FIG. 1 is a desktop computer system with a peripheral display monitor. However, the disclosed examples are also applicable to other devices, including but not limited to laptop computers with integrated display monitors, flat-screen televisions, tablet computers, smartphones, portable game systems, console game systems, and media players, for example.

Figure 2:
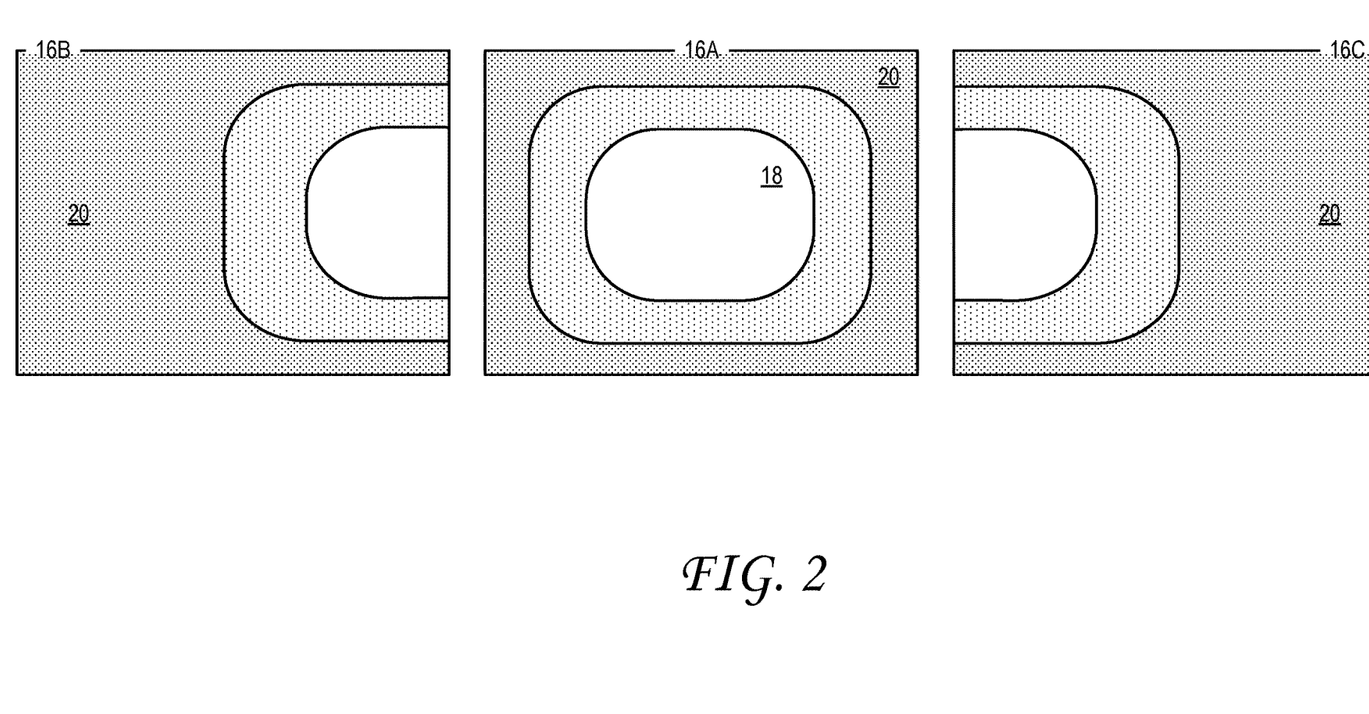
FIG. 2 represents an example display brightness as viewed from the perspectives of three different observers.

FIG. 1 also illustrates an example use scenario of device 10. The drawing shows three observers 14A, 14B, 14C viewing electronic display 12. Because the display has a relatively large format, and because each observer is relatively close to the display, the viewing angle will vary significantly depending on which region of the display area a given observer is sighting at a given time. To put it another way, the viewable area of the display subtends a large solid angle in the field of view of each observer. If display 12 were substantially collimated light, or light of another narrow angular distribution profile, in a direction normal to the display screen, an effect as shown in FIG. 2 may be observed. Panel 16A of FIG. 2 represents a display image from a display with a narrow angular light intensity distribution as seen by central observer 14A. It includes a central bright region or 'hotspot' 18, surrounded by a dim region 20. Panels 16B and 16C represent the display image as seen by peripheral observers 14B and 14C, respectively. These observers may observe dim regions 20 above and below eye level and to the far side of the display screen. As described in more detail below, the disclosed examples may help to address this issue.

Figure 3:
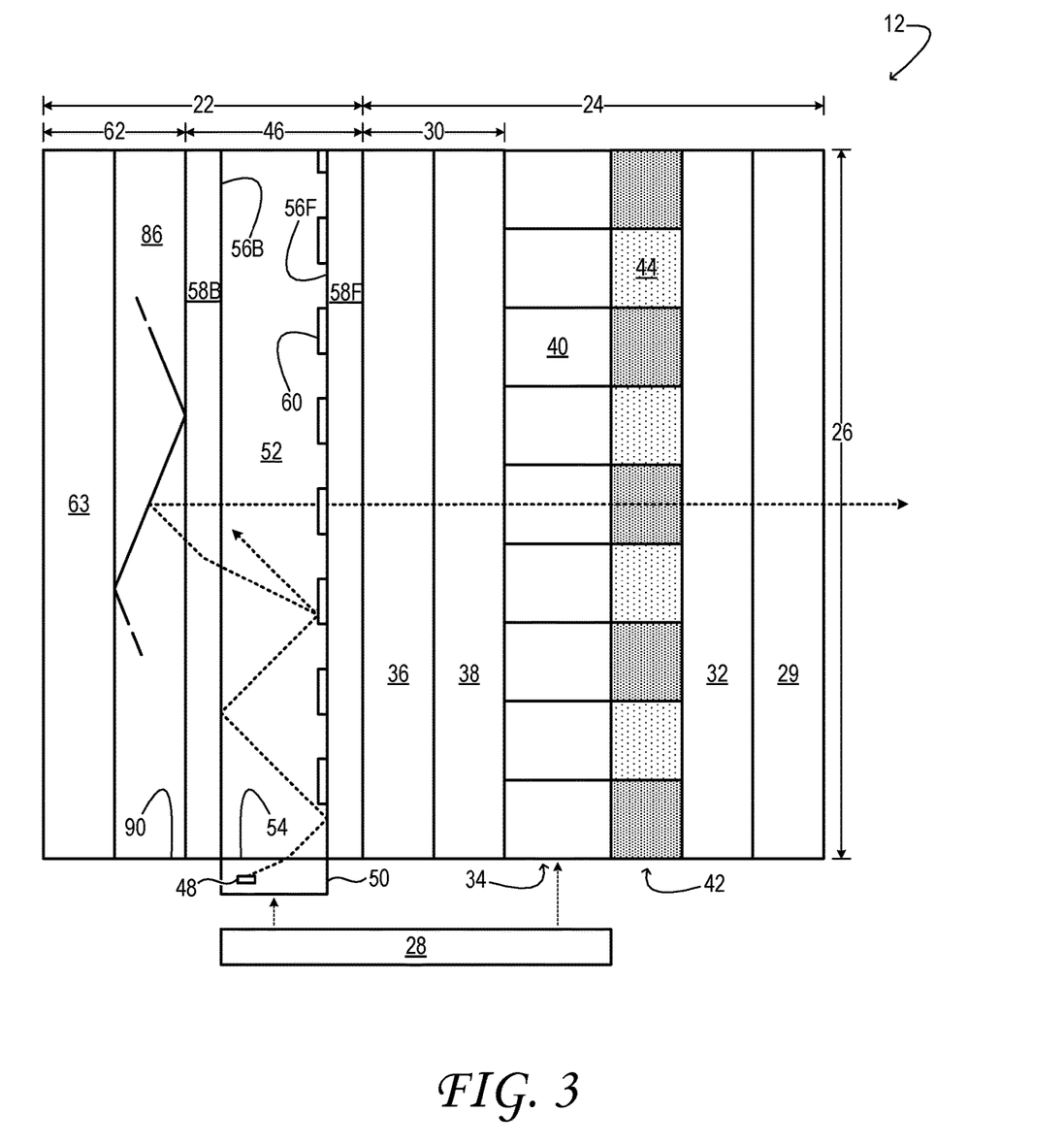
FIG. 3 is a schematic, cross-sectional drawing of an example electronic display.

FIG. 3 shows aspects of an example electronic display 12 of device 10. The electronic display includes a flat-panel illuminator 22 and an image-forming layer 24 configured to receive light from the flat-panel illuminator. The image-forming layer is configured to form a display image in display area 26 by modulating the light released by the flat-panel illuminator. Such modulation may be controlled both spatially and temporally, via electronic controller 28.

In some implementations, image-forming layer 24 may comprise a liquid-crystal display (LCD) layer arranged beneath a protective glass or transparent molded sheet 29. As such, the image-forming layer may include an upstream polarizer 30, a downstream polarizer 32, and a pixel matrix 34 arranged between the upstream and downstream polarizers. Each of the upstream and downstream polarizers may be configured to transmit plane polarized light. Light from flat-panel illuminator 22 is filtered by the upstream polarizer to select light of a predetermined polarization state. In some implementations, upstream polarizer 30 may include a recycling polarizer 36 situated upstream of an absorptive polarizer 38. The recycling polarizer reflects at least some light of an undesired polarization state back to the flat-panel illuminator. The absorptive polarizer absorbs the remaining light of the undesired polarization state, to ensure a high overall contrast ratio in polarization-state selection. Accordingly, substantially plane-polarized light passes into pixel matrix 34 of the image-forming layer.

At each individually addressable pixel element 40 of pixel matrix 34, the polarization plane of the incident light may be rotated by twisted-nematic liquid crystal therein. The twisted-nematic liquid crystal is formed when the pixel element is biased electrically, via electronic controller 28. When the bias is removed, the twisted-nematic liquid crystal relaxes to the twisted state, which does not rotate the polarization plane. In implementations in which the upstream and downstream polarizers have the same orientation, light having a rotated polarization plane is blocked by the downstream polarizer commensurate to the degree of rotation. Thus, by providing controlled electrical bias to each of the pixel elements, a display image is formed in display area 26 by the light passing through image-forming layer 24.

In some implementations, image-forming layer 24 includes a color-filter matrix 42 of individual color-filter elements 44 arranged in registry with pixel elements 40. Red-, green-, and blue-transmissive color filter elements may be arranged in a repeating pattern in the color-filter matrix, to enable formation of a full-color image. In monochrome display implementations, the color-filter matrix may be omitted.

Continuing in FIG. 3, flat-panel illuminator 22 includes light guide 46 and one or more light emitters 48 configured to feed light into the light guide. The detailed configuration of light emitters 48 is not particularly limited. In some implementations, the light emitters may be side-emitting, surface-mount light-emitting diodes (LEDs). In some implementations, a coupling optic 50 enables emission from the one or more light emitters to couple efficiently into light guide 46.

Light guide 46 includes a transparent core material 52, such as polycarbonate, acrylic or glass. The light guide presents an input edge 54 where light emission from light emitters 48 is received. Adjacent the input edge 54 of the light guide are faces 56 (viz., 56F and 56B), each bounded by the input edge. This structure enables propagation of the light received at the input edge by total-internal reflection (TIR) from the faces. In some implementations, faces 56F and 56B may directly interface with air. In other implementations, to achieve TIR without requiring an air gap at either face, light guide 46 includes one or more of a first cladding layer 58F and a second cladding layer 58B. The first and second cladding layers are arranged on opposite sides of core material 52. In some implementations, the light guide may be coupled optically to image-forming layer 24 via the front cladding layer.

The refractive indices of first cladding layer 58F and second cladding layer 58B are lower than that of material 52. In some implementations, the refractive index of the forward cladding layer may be lower than that of the back cladding layer, so that the propagating light is released (wholly or preferentially) from back face 56B. To promote release of the propagating light, light guide 46 includes a plurality of light-extraction features 60. The extraction features may be formed in any suitable manner, such as by machining or embossing, and may have any suitable size.

When the propagating light interacts with an extraction feature, some of the light is scattered at a subcritical angle and is therefore released from the light guide. Accordingly, the flat-panel illuminator also includes a light-steering layer 62 configured to redirect the emerging rays through image-forming layer 24 for image production by image-forming layer 24 to form a display image in display area 26.

Figure 4:
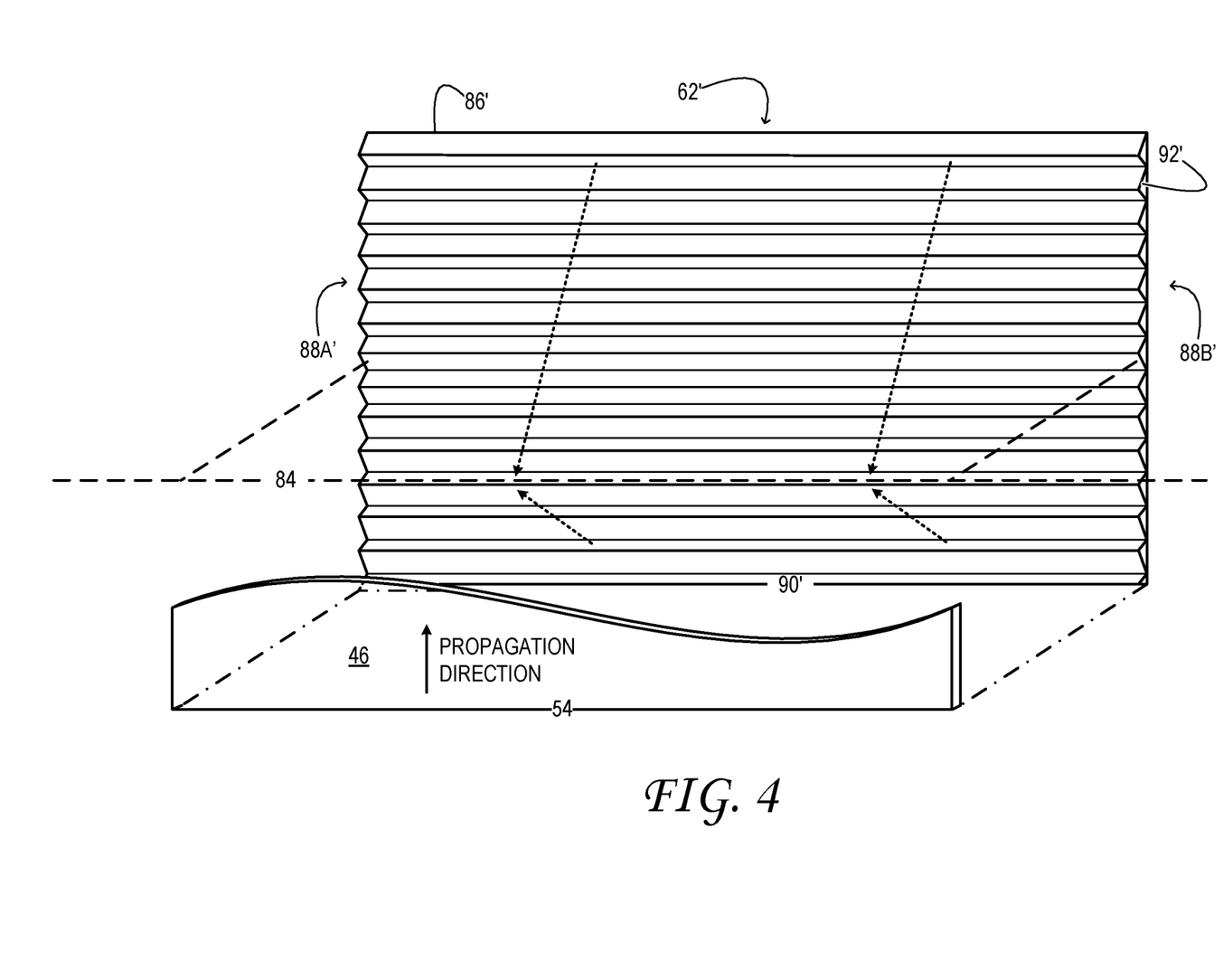
FIG. 4 shows a partially cutaway exploded view of an example light-steering layer and light guide of a flat-panel illuminator.

In the depicted example, light-steering layer 62 is arranged substantially parallel to light guide 46. In some implementations, the light-steering layer may be coupled optically to the light guide, via second cladding layer 58B. As noted above, light-steering layer 62 may be configured to redirect at least some of shallow-angle rays released from the light guide into a direction normal to the light guide. However, the light-steering layer may not steer all of the light rays fully normal to a plane of the image-forming layer. Rather, as shown in FIG. 4, light-steering layer 62' may be configured to direct light emitted from a more peripheral region of the light guide and light emitted from a more central region of the light guide toward one another. In other words, light from the more central and more peripheral regions are steered together. This may help to avoid the appearance of central "hot spots" and peripheral dim regions in a displayed image from a user's perspective.

In various examples, light-steering layer may steer light in one direction, or in two, orthogonal directions. Where light is steered in one direction, the light-steering layer may be configured to steer light emitted from the light guide toward an imaginary line 84 (or a finite region of space encompassing imaginary line 84), which lies forward of image-forming layer 24 and runs parallel to the light guide. In some implementations, the imaginary line toward which the light rays are steered is also parallel to an edge of the light guide. In some implementations, imaginary line 84 may be arranged forward of molded sheet 86' and halfway up the molded sheet in a direction perpendicular to input-aligned edge 90'. In other implementations, light from a peripheral region and central region of the light guide may be steered together in any other suitable manner.

Figure 5:
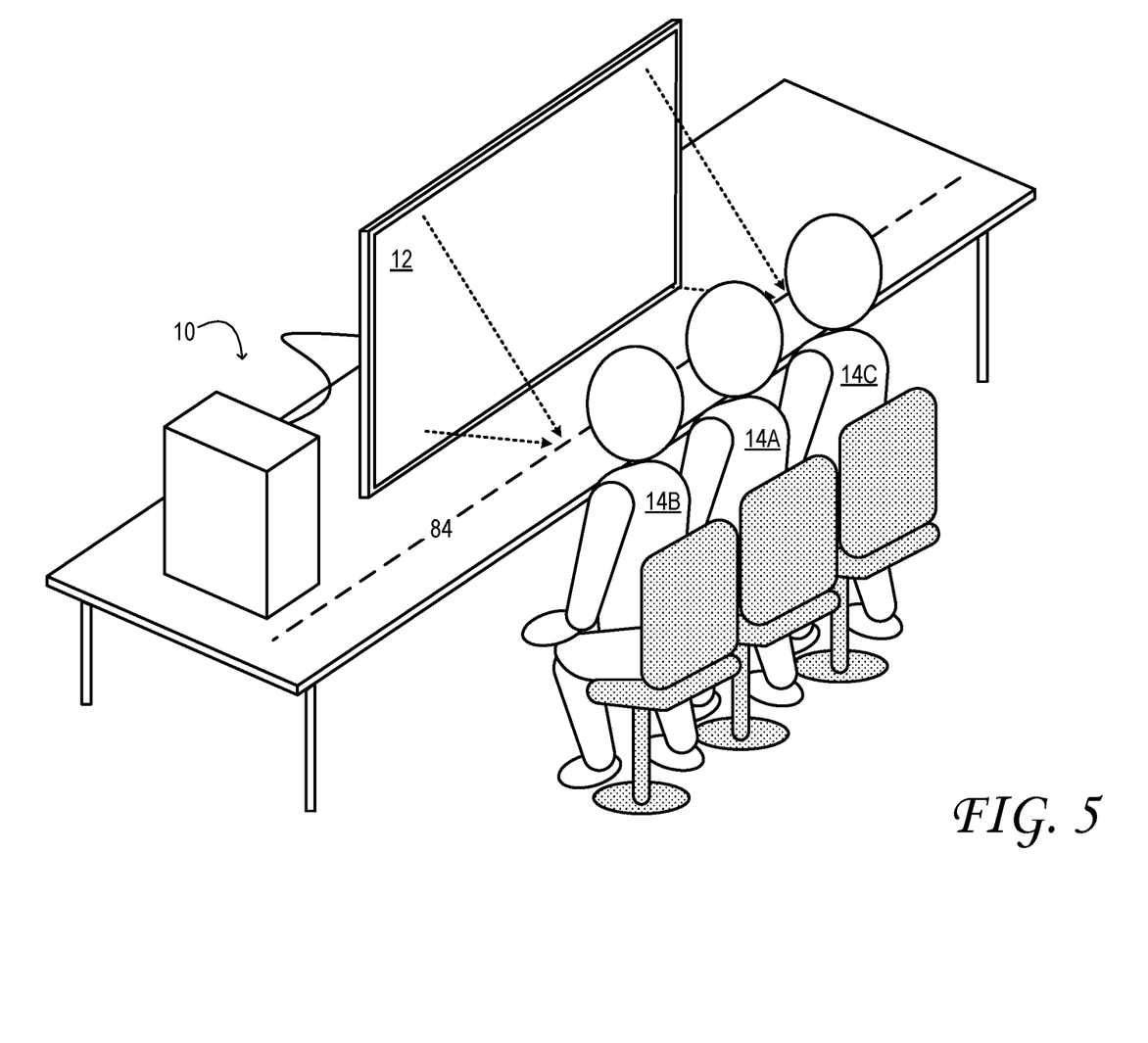
FIG. 5 illustrates example light steering via the flat-panel illuminator of FIG. 4.
Figure 6:
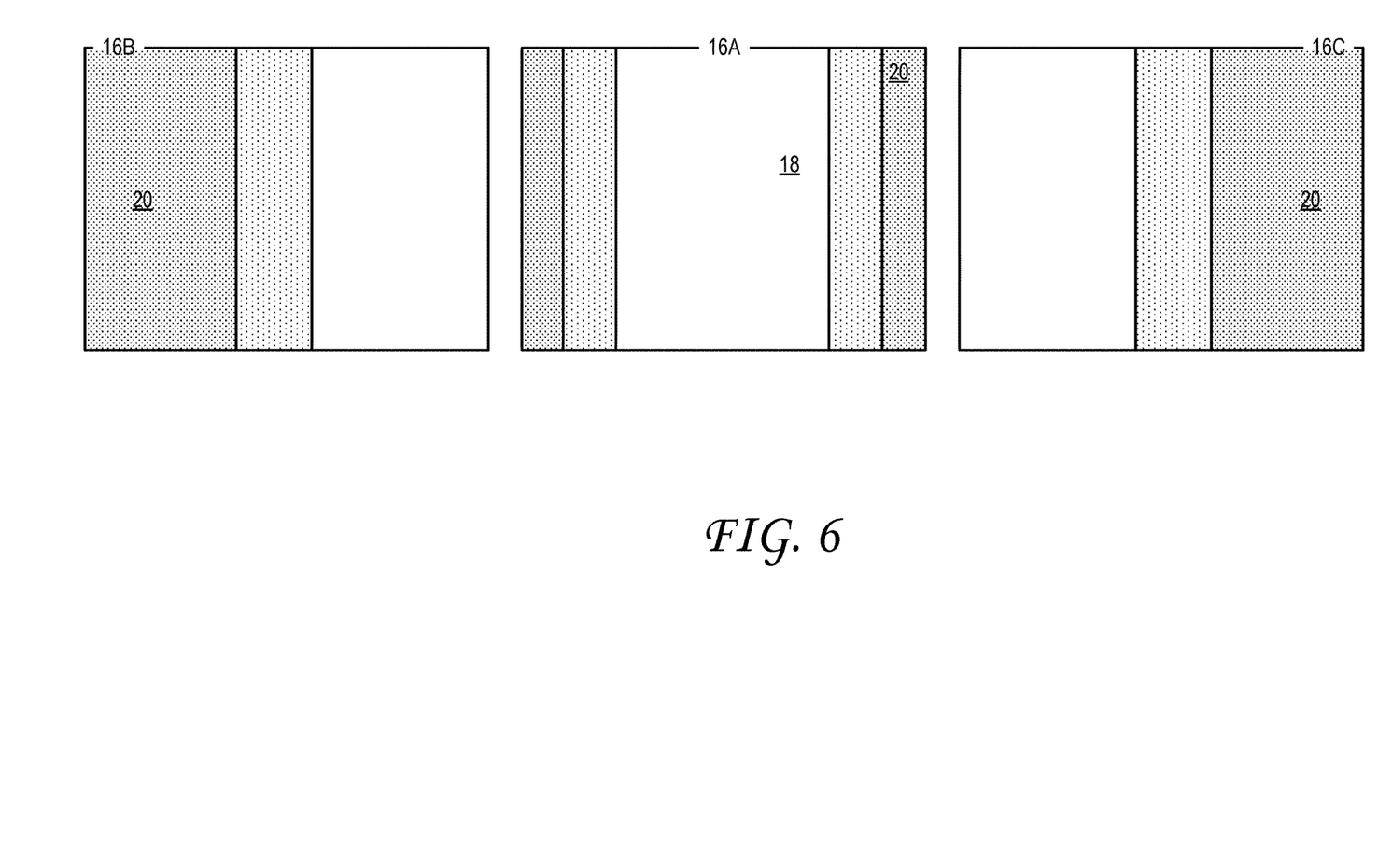
FIG. 6 represents another example display as viewed from the perspectives of three different observers.

The imaginary line 84 toward which the light rays are steered may pass through the expected pupilary positions of one or more observers of electronic display 12, as shown in FIG. 5. Accordingly, observers 14A, 14B, and 14C would now observe the display images as shown in panels 16A, 16B, and 16C of FIG. 6, which are uniformly bright in the vertical direction. In other implementations, light from the left and right sides of the display may be converged towards the middle of the display area, making the display image uniformly bright in the horizontal direction. Accordingly, imaginary line 84 may be a vertical line.

Returning now to FIG. 4, in some implementations, light-steering layer 62' comprises a molded sheet 86' embossed with light steering facets. The molded sheet includes two opposing propagation-aligned edges 88A' and 88B'. The propagation-aligned edges run parallel to the direction of light propagation in light guide 46. The propagation-aligned edges further are adjacent and perpendicular to input-aligned edge 90', which is aligned to input edge 54 of the light guide. Formed on the molded sheet is a series of prismatic, Fresnel-like facets 92' of varied orientation.

In some implementations, each facet 92' may be reflective (for example, coated with a reflective material). When reflective facets are used, light-steering layer 62' and image-forming layer 24 may be arranged on opposite sides of light guide 46, as shown in FIG. 3. In other implementations, however, at least some of the facets may be refractive. In such implementations, the light-steering layer and the image-forming layer may be arranged on the same side of the light guide.

In these and other implementations, the orientation of facets 92' may be varied due to a curvature of each facet. When only the facet angle is varied, the effect achieved by light-steering layer 62' may be achieved in one dimension—e.g., the display light is steered onto imaginary line 84. In other implementations, however, the light-steering layer may be configured to steer each ray in two dimensions toward a point—e.g., an estimated interpupilary point of an observer. For an observer viewing from an appropriate location (e.g. centered on the display), hotspot 18 may be removed, and the display image may appears uniformly bright.

Figure 7:
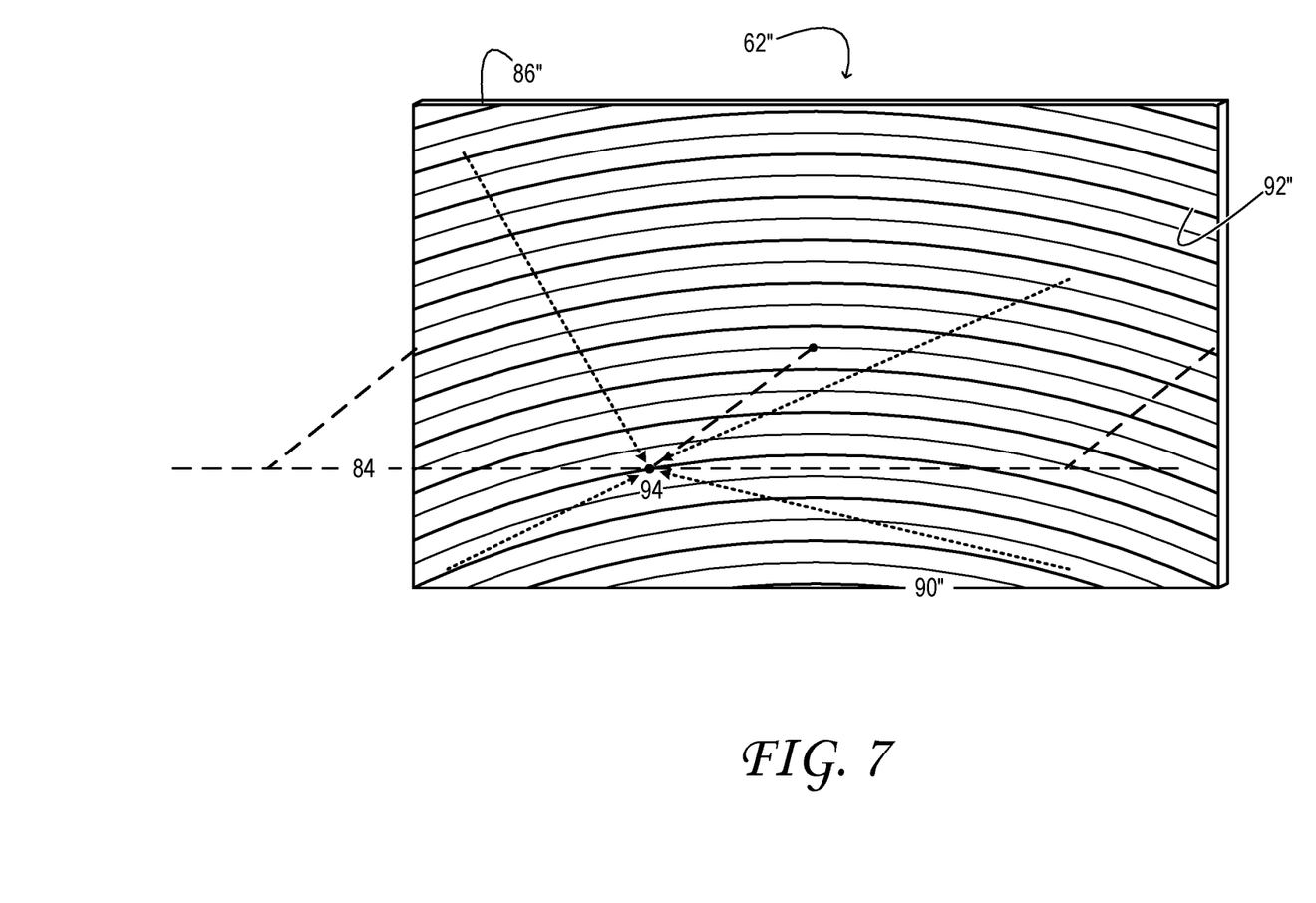
FIG. 7 shows an example light-steering layer including a molded sheet with curved facets.

To achieve steering in two dimensions, a facet angle may vary across the series of facets, and each facet may have a curved configuration (e.g. a circular curvature). An example light-steering layer 62" based on a molded sheet 86" having a series of curved Fresnel-like facets 92" is shown by example in FIG. 7. In this series, the bending angle of the turning film increases with radius. Here all of the emergent light rays are steered toward point 94 (or a finite region of space encompassing point 94).

Figure 8:
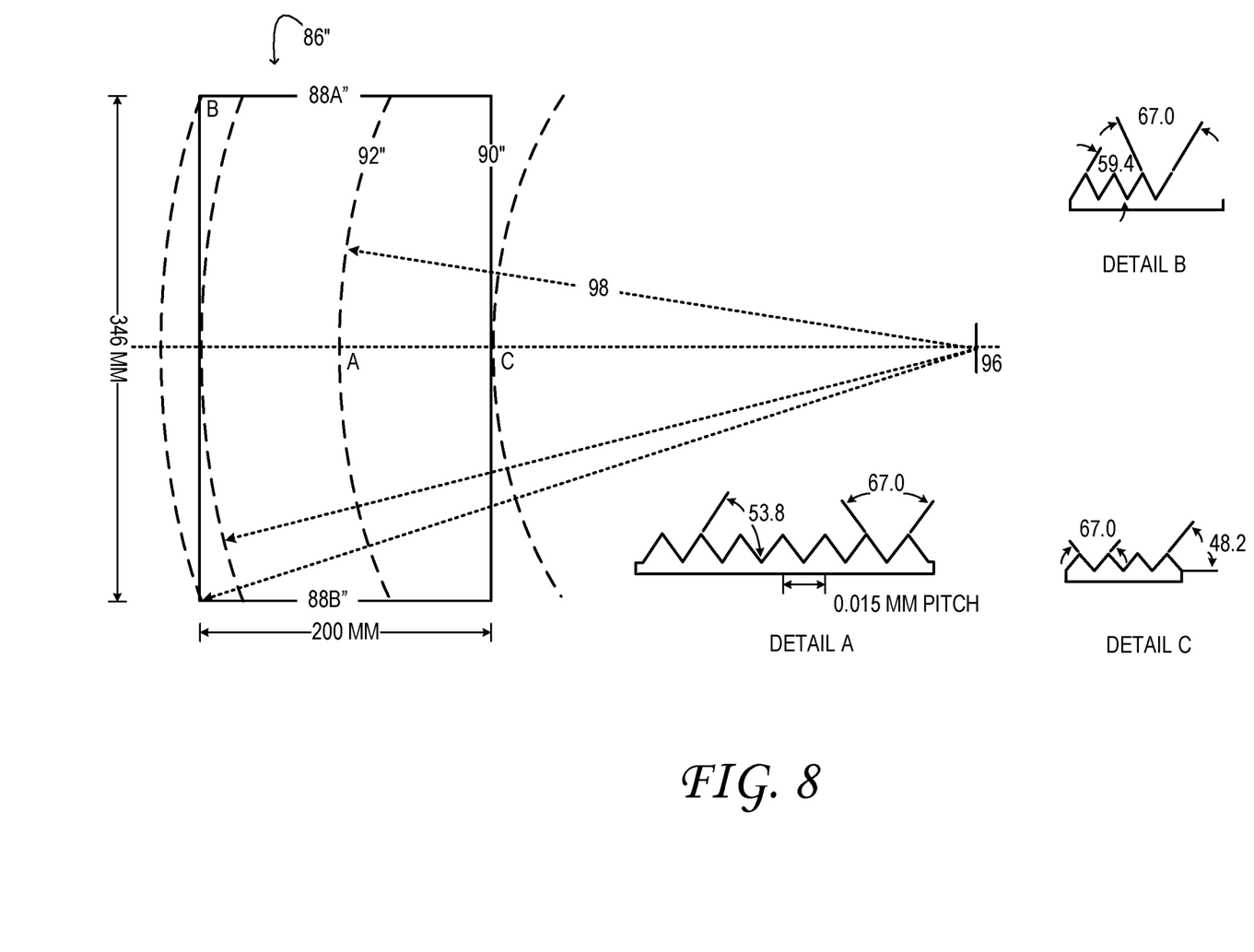
FIG. 8 is a third-angle diagram representing the example molded sheet of FIG. 7.

FIG. 8 provides a third-angle diagram perspective of molded sheet 86". In this example, the center of the curvature 96 for each facet 92" is a projection of imaginary point 94 (not shown in FIG. 8) rotated ninety degrees within a plane parallel to propagation-aligned edges 88A", 88B" of the molded sheet 86" and onto the plane of the molded sheet. Stated alternatively, imaginary point 94 lies directly above the point A of FIG. 8, rotated 90 degrees from 96, at a distance equal to the radius 98 of the facet curvature. Furthermore, the radius 98 of the facet curvature increases with increasing distance from input-aligned edge 90" of the molded sheet. For example, the radius of curvature as a function of distance from the input-aligned edge may correspond to a constant plus that distance. In other examples, each facet may have any other suitable curvature than circular, and the facet angles may vary in any suitable manner. In this manner hotspots at horizontal and vertical peripheries of a display may be avoided.

Another example provides an electronic display comprising a light guide configured to release light over a display area, an image-forming layer configured to form a display image by modulating the light released by the light guide, and a light-steering layer configured to steer together light released from a peripheral region of the light guide and light released from a central region of the light guide.

In some implementations, the light-steering layer additionally or alternatively comprises a series of facets having a varying orientation across the series of facets. In some implementations, the orientation additionally or alternatively is varied due to a curvature of each facet. In some implementations, the facets additionally or alternatively have a circular curvature. In some implementations, the light-steering layer additionally or alternatively is configured to steer each ray toward a common point in space. In some implementations, each facet is reflective, and the light-steering layer and the image-forming layer additionally or alternatively are arranged on opposite sides of the light guide. In some n a ions, at least some of the facets are refractive, and the light-steering layer and the image-forming layer additionally or alternatively are arranged on a same side of the light guide. In some implementations, the light-steering layer additionally or alternatively is coupled to the light guide via a cladding.

Another example provides an electronic display comprising a light guide configured to release light distributed over a display area, an image-forming layer configured to form a display image by modulating the light released by the light guide, and a light-steering layer configured to steer together light released from a central portion of the light guide and light released from a peripheral portion of the light guide, the light-steering layer including a series of reflective facets.

In some implementations, the reflective facets additionally or alternatively have a curvature and a varying angle across the series. In some implementations, the curvature additionally or alternatively is a circular curvature. In some implementations, the light guide additionally or alternatively includes a core material and first and second cladding layers arranged on opposite sides of the core material, and refractive indices of the first and second cladding layers are both are lower than that of the core material. In some implementations, the light-steering layer additionally or alternatively is coupled optically to the light guide, via the second cladding layer. In some implementations, the image-forming layer additionally or alternatively is coupled optically to the light guide via the first cladding layer.

Another example provides a light-steering layer for an electronic display, the light-steering layer comprising a molded sheet, and, formed on the molded sheet, a series of facets having angles that vary across the series such that light rays entering a periphery of the molded sheet and light rays entering a central region of the molded sheet are steered together.

In some implementations, the facets additionally or alternatively are reflective. In some implementations, the facets additionally or alternatively are configured to steer rays toward a common point in space. In some implementations, the facets additionally or alternatively are curved, wherein the molded sheet includes two opposing propagation-aligned edges adjacent and perpendicular to the input-aligned edge, and wherein a center of curvature of the facets is a projection of the common point rotated within a plane parallel to the propagation-aligned edges of the molded sheet and onto a plane of the molded sheet. In some implementations, a radius of the curvature additionally or alternatively increases with increasing distance from an input-aligned edge of the molded sheet. In some implementations, the radius of curvature as a function of distance from the input-aligned edge of the molded sheet additionally or alternatively is equal to a constant plus a distance from the input-aligned edge of the molded sheet.

It will be understood that the configurations and/or approaches described herein are described for the purpose of example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An electronic display comprising:
   a light guide having peripheral and central regions each configured to guide light across a display area;
   an array of light-extraction features formed on the light guide and configured to scatter the light back through the light guide;
   distinct from the array of light-extraction features and the light guide, a light-steering layer comprising a series of reflective facets having a varying orientation across the series, the light-steering layer being coated with a reflective material and configured to receive the light scattered back through the light guide and to steer light released from the peripheral region of the light guide toward light released from the central region of the light guide; and
   an image-forming layer configured to form a display image by modulating the light released from the peripheral and central regions of the light guide.

2. The electronic display of claim 1, wherein the orientation is varied due to a curvature of each facet.

3. The electronic display of claim 2, wherein the facets have a circular curvature.

4. The electronic display of claim 1, wherein the light-steering layer is configured to steer each ray toward a common point in space.

5. The electronic display of claim 1, wherein the light-steering layer and the image-forming layer are arranged on opposite sides of the light guide.

6. The electronic display of claim 1, wherein the light-steering layer is coupled to the light guide via a cladding.

7. An electronic display comprising:
   a light guide having peripheral and central regions each configured to guide light across a display area;
   an array of light-extraction features formed on the light guide and configured to scatter the light back through the light guide;
   distinct from the array of light-extraction features and the light guide, a light-steering layer comprising a series of reflective facets having a varying orientation across the series, the light-steering layer being coated with a reflective material and configured to receive the light scattered back through the light guide and to steer together light released from the central region of the light guide and light released from the peripheral region of the light guide; and
   an image-forming layer configured to form a display image by modulating the light released from the peripheral and central regions of the light guide.

8. The electronic display of claim 7, wherein the reflective facets have a curvature and a varying angle across the series.

9. The electronic display of claim 8, wherein the curvature is a circular curvature.

10. The electronic display of claim 7, wherein the light guide includes a core material and first and second cladding layers arranged on opposite sides of the core material, and wherein refractive indices of the first and second cladding layers are both are lower than that of the core material.

11. The electronic display of claim 10, wherein the light-steering layer is coupled optically to the light guide, via the second cladding layer.

12. The electronic display of claim 10, wherein the image-forming layer is coupled optically to the light guide via the first cladding layer.

13. A light-steering layer for an electronic display, the light-steering layer comprising:
    a molded sheet coated with a reflective material; and
    formed on the molded sheet, a series of curved, reflective facets having angles that vary across the series such that light rays entering a periphery of the molded sheet and light rays entering a central region of the molded sheet are steered together, toward a common point in space,
    wherein the molded sheet includes two opposing propagation-aligned edges adjacent and perpendicular to an input-aligned edge, and wherein a center of curvature of the facets is a projection of the common point rotated within a plane parallel to the propagation-aligned edges of the molded sheet and onto a plane of the molded sheet.

14. The light-steering layer of claim 13, wherein a radius of the curvature increases with increasing distance from an input-aligned edge of the molded sheet.

15. The light-steering layer of claim 14, wherein the radius of curvature as a function of distance from the input-aligned edge of the molded sheet is equal to a constant plus a distance from the input-aligned edge of the molded sheet.

16. The electronic display of claim 1 wherein the light-steering layer is configured to receive shallow-angle light from the light guide and to steer the high-angle light to near-normal incidence on the image-forming layer.

* * * * *